US008020190B2

(12) United States Patent
Plummer

(10) Patent No.: US 8,020,190 B2
(45) Date of Patent: Sep. 13, 2011

(54) ENHANCED BROWSER SECURITY

(75) Inventor: David W. Plummer, Redmond, WA (US)

(73) Assignee: SDC Software, Inc., Redwood City, CA (US)

( * ) Notice: Subject to any disclaimer, the term of this patent is extended or adjusted under 35 U.S.C. 154(b) by 973 days.

(21) Appl. No.: 11/549,812

(22) Filed: Oct. 16, 2006

(65) Prior Publication Data

US 2007/0199073 A1 Aug. 23, 2007

Related U.S. Application Data

(60) Provisional application No. 60/727,288, filed on Oct. 14, 2005, provisional application No. 60/805,683, filed on Jun. 23, 2006.

(51) Int. Cl.
*G06F 17/00* (2006.01)
(52) U.S. Cl. ............ 726/1; 726/26; 713/165; 713/166
(58) Field of Classification Search .................. 726/1; 713/164–167; 709/229
See application file for complete search history.

(56) References Cited

U.S. PATENT DOCUMENTS

| | | | |
|---|---|---|---|
| 5,257,020 A | 10/1993 | Morse | |
| 5,828,839 A | 10/1998 | Moncreiff | |
| 5,974,454 A | 10/1999 | Apfel | |
| 5,987,611 A * | 11/1999 | Freund | 726/4 |
| 6,029,245 A * | 2/2000 | Scanlan | 726/4 |
| 6,061,716 A | 5/2000 | Moncreiff | |
| 6,115,471 A | 9/2000 | Oki et al. | |
| 6,151,708 A | 11/2000 | Pedrizetti | |
| 6,175,619 B1 | 1/2001 | DeSimone | |
| 6,192,394 B1 | 2/2001 | Gutfreund et al. | |
| 6,212,535 B1 | 4/2001 | Weikart et al. | |
| 6,269,456 B1 | 7/2001 | Hodges | |
| 6,338,094 B1 | 1/2002 | Scott et al. | |
| 6,366,912 B1 | 4/2002 | Wallent | |
| 6,411,966 B1 | 6/2002 | Kwan et al. | |
| 6,412,073 B1 | 6/2002 | Rangan | |
| 6,418,466 B1 * | 7/2002 | Bertram et al. | 709/221 |
| 6,434,599 B1 | 8/2002 | Porter | |
| 6,442,590 B1 | 8/2002 | Inala et al. | |

(Continued)

FOREIGN PATENT DOCUMENTS

WO   0060483 A1   10/2000

(Continued)

OTHER PUBLICATIONS

Tomshardware.com, Spywareblaster and IE-Spyad Article http://www.tomshardware.com/2005/08/19/windows_spyware_survival_tools/page2.html.

*Primary Examiner* — Eleni A Shiferaw
*Assistant Examiner* — Jing Sims
(74) *Attorney, Agent, or Firm* — Richard T. Black

(57) ABSTRACT

A machine-executable method implementable in a system operable to execute a browser application having at least one security-context zone and operable to apply at least one security policy to interaction between the system and web sites corresponding to domain identifiers populating the at least one security-context zone includes comparing a first set of domain identifiers populating a first security-context zone of the at least one security-context zone with a second set of domain identifiers. The method further includes populating the first security-context zone with at least one second-set identifier not included in the first set of domain identifiers.

8 Claims, 6 Drawing Sheets

U.S. PATENT DOCUMENTS

| | | |
|---|---|---|
| 6,473,800 B1 * | 10/2002 | Jerger et al. .................... 709/226 |
| 6,510,458 B1 | 1/2003 | Berstis |
| 6,515,681 B1 | 2/2003 | Knight |
| 6,532,477 B1 | 3/2003 | Tang et al. |
| 6,606,657 B1 | 8/2003 | Zilberstein et al. |
| 6,691,159 B1 | 2/2004 | Grewal et al. |
| 6,708,276 B1 | 3/2004 | Yarsa |
| 6,850,255 B2 | 2/2005 | Muschetto |
| 7,000,107 B2 | 2/2006 | Hewitt |
| 7,069,318 B2 | 6/2006 | Burbeck et al. |
| 7,225,157 B2 | 5/2007 | Howard |
| 7,318,238 B2 | 1/2008 | Elvanoglu |
| 2002/0002586 A1 | 1/2002 | Rafal et al. |
| 2002/0016788 A1 | 2/2002 | Burridge |
| 2002/0029245 A1 | 3/2002 | Nahon et al. |
| 2002/0059379 A1 | 5/2002 | Harvey et al. |
| 2002/0095663 A1 | 7/2002 | Joory |
| 2002/0104025 A1 | 8/2002 | Wrench, Jr. |
| 2002/0123912 A1 | 9/2002 | Subramanian et al. |
| 2003/0051054 A1 | 3/2003 | Redlich et al. |
| 2004/0098467 A1 * | 5/2004 | Dewey et al. .................. 709/219 |
| 2004/0111467 A1 | 6/2004 | Willis |
| 2004/0172415 A1 | 9/2004 | Messina et al. |
| 2004/0225715 A1 | 11/2004 | Gottfried |
| 2004/0254832 A1 | 12/2004 | Harkin |
| 2005/0114625 A1 * | 5/2005 | Snyder .............................. 712/1 |
| 2005/0251573 A1 * | 11/2005 | Merkow et al. ................ 709/226 |
| 2006/0101409 A1 * | 5/2006 | Bemmel ........................ 717/126 |
| 2007/0118669 A1 * | 5/2007 | Rand et al. .................... 709/245 |
| 2007/0199073 A1 * | 8/2007 | Plummer ......................... 726/26 |
| 2008/0098212 A1 * | 4/2008 | Helms et al. ................... 713/155 |
| 2010/0269161 A1 * | 10/2010 | Leahy et al. ...................... 726/5 |

FOREIGN PATENT DOCUMENTS

| | | |
|---|---|---|
| WO | 0118693 A2 | 3/2001 |

* cited by examiner

ENHANCED BROWSER SECURITY

PRIORITY CLAIM/CROSS REFERENCE TO RELATED APPLICATIONS

The present application claims priority from U.S. Provisional Application No. 60/727,288 filed Oct. 14, 2005, which is, along with commonly owned and co-pending U.S. application Ser. No. 11/351,257 filed on Feb. 6, 2006, U.S. patent application Ser. No. 11/549,804 entitled "Control of Application Access to System Resources," U.S. patent application Ser. No. 11/549,783 entitled "Control of Application Access to System Resources," and U.S. Provisional Application No. 60/805,683 filed on Jun. 23, 2006, herein incorporated by reference in its entirety.

FIELD OF THE INVENTION

Embodiments of the invention relate generally to computer systems and, more particularly, to improvements in security for browser applications.

BACKGROUND OF THE INVENTION

Many conventional Internet-browser applications ("browsers") include one or more security "zones" that allow a user to apply one or more security policies to web sites accessible to the browsers. Such a security policy may govern whether an accessed web site is allowed to, for example, run ActiveX controls on or automatically upload/download software to the system on which the browser is running. As shown in FIG. 1, the browser may include a "Restricted" zone represented by a user interface 10 displayable on a display device (not shown) and having one or more fields 20A, 20B that a user can populate with the domain identifiers of web sites to which the user would like to apply a comparatively restrictive security policy. In the example illustrated in FIG. 1, the user has previously placed several domain identifiers (e.g., www.abc.com, www.cba.com) in the Restricted zone, a fact illustrated in field 20B. As such, the browser applies a predefined security policy associated with the Restricted zone to each of the web sites associated with the domain identifiers displayed in field 20B. If the user wishes to add a web site to the Restricted zone, the user must type or otherwise manually enter the domain identifier into the field 20A.

As the number of web sites that the user wishes to add to a zone increases, it should be appreciated that the task of employing a user interface, such as the interface 10 of FIG. 1, to manually enter each associated domain identifier becomes increasingly nontrivial. Moreover, by the time the user decides to so restrict a web site, it is highly possible that the user has already suffered some negative effect from accessing the web site due to the user being previously unaware of the harmful nature of the web site.

SUMMARY OF THE INVENTION

In an embodiment of the invention, a machine-executable method implementable in a system operable to execute a browser application having at least one security-context zone and operable to apply at least one security policy to interaction between the system and web sites corresponding to domain identifiers populating the at least one security-context zone includes comparing a first set of domain identifiers populating a first security-context zone of the at least one security-context zone with a second set of domain identifiers. The method further includes populating the first security-context zone with at least one second-set identifier not included in the first set of domain identifiers.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
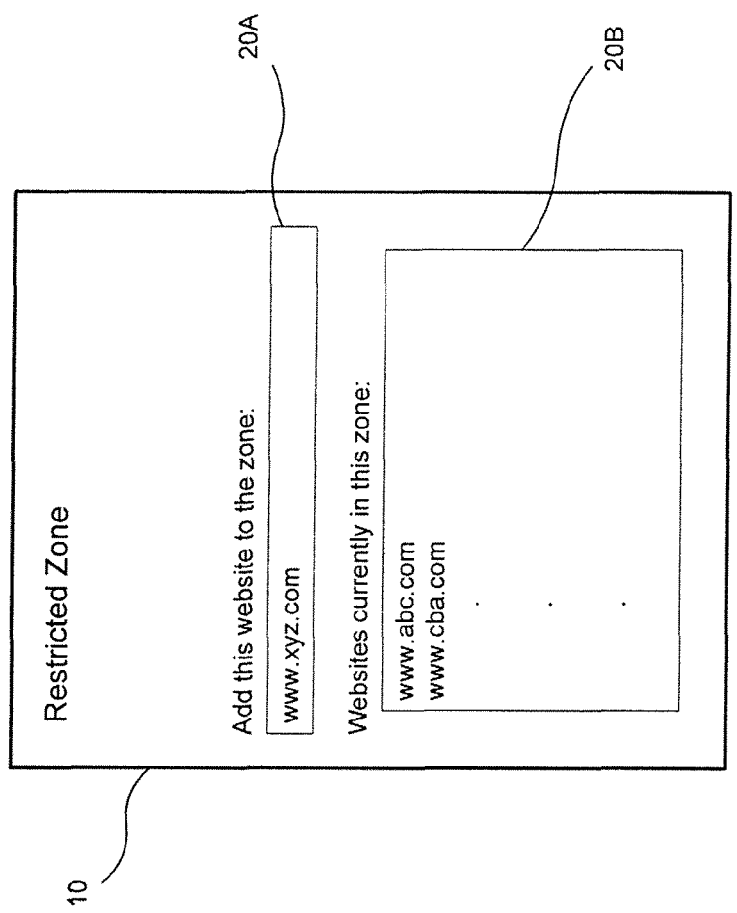
FIG. 1 illustrates a conventional user interface.
Figure 2:
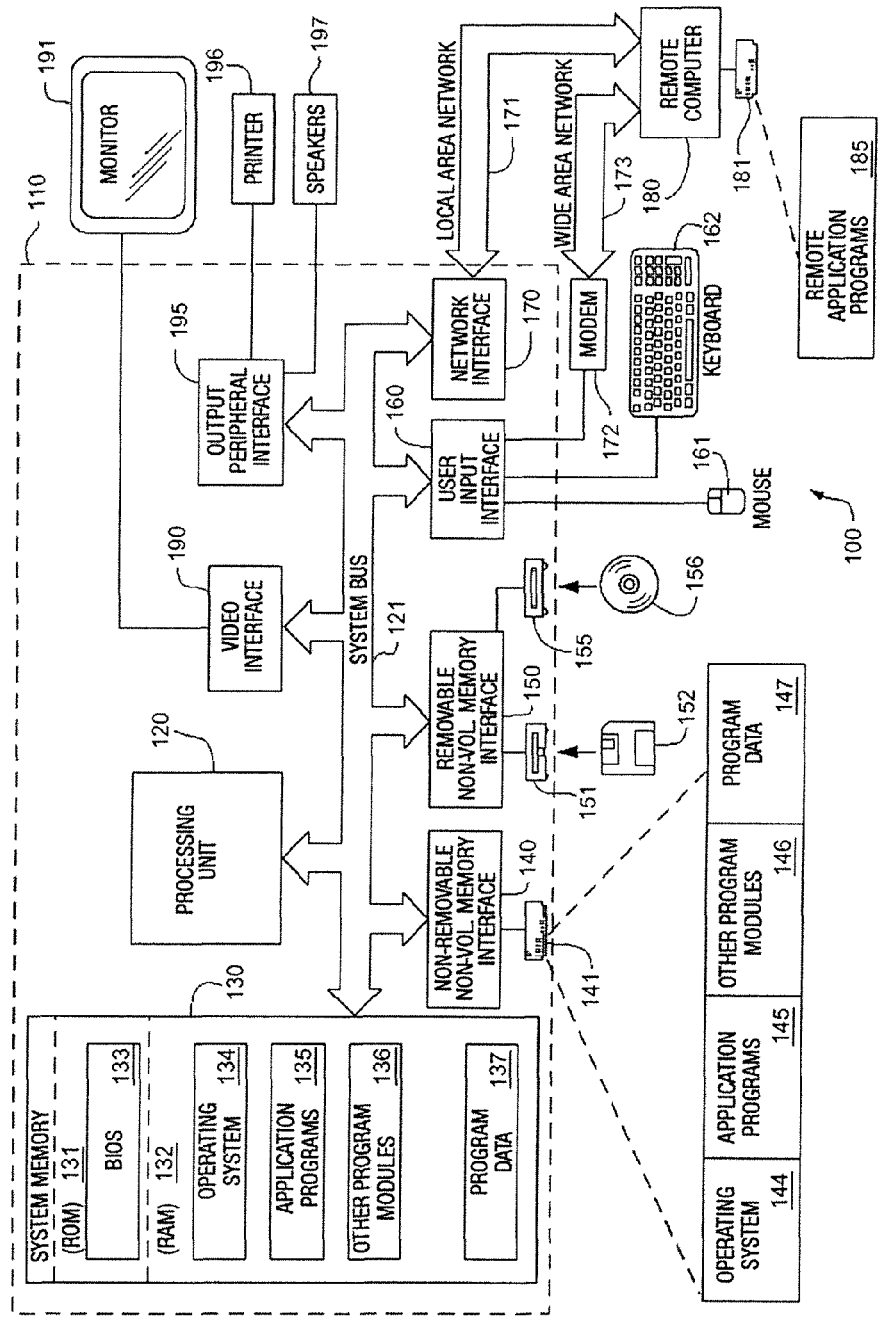
FIG. 2 is a schematic view of an exemplary operating environment in which an embodiment of the invention can be implemented.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
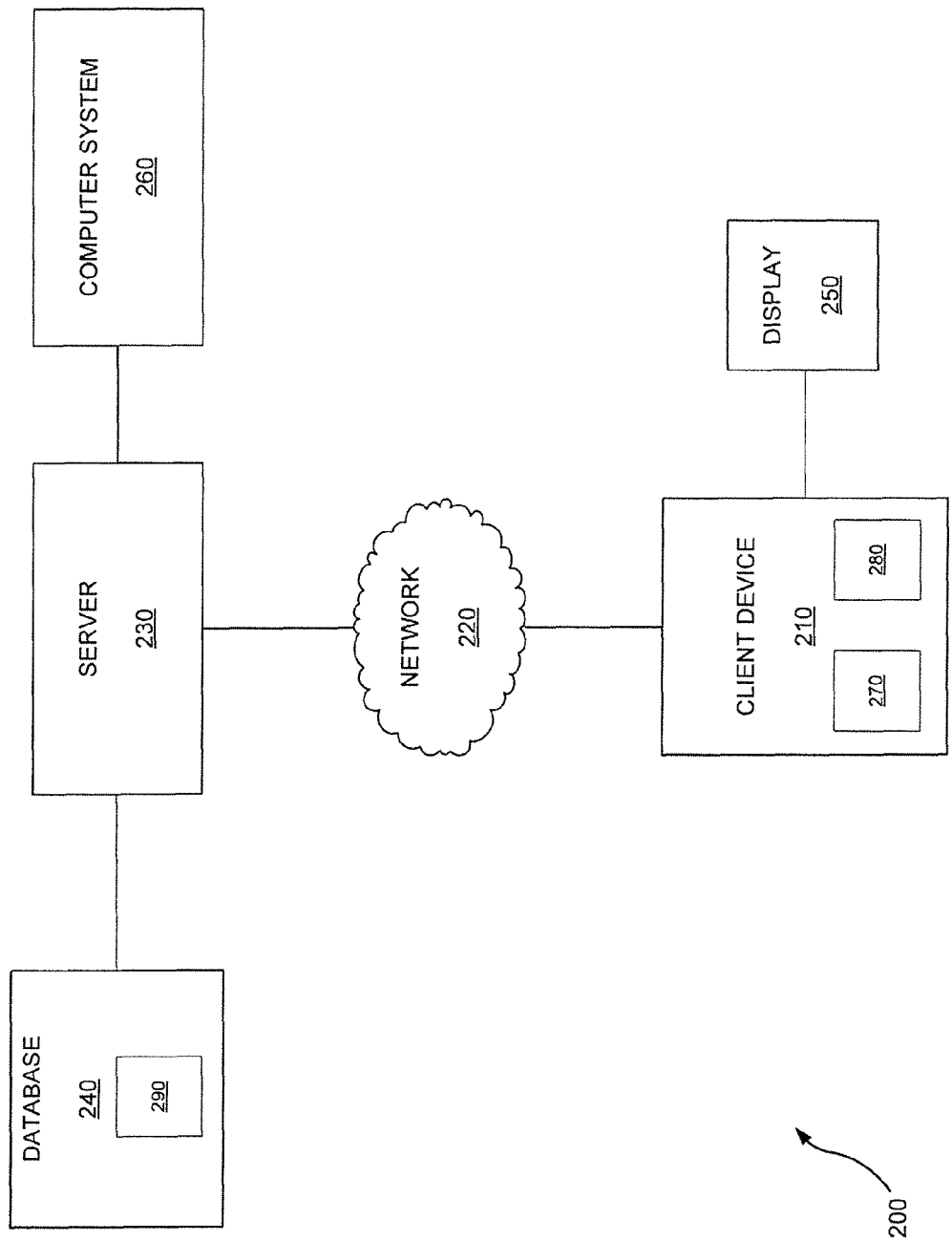
FIG. 3 is a functional block diagram of an exemplary operating environment in which an embodiment of the invention can be implemented.

Referring now to FIG. 3, an embodiment of the present invention can be described in the context of an exemplary computer network system 200 as illustrated. System 200 includes an electronic client device 210, such as a personal computer or workstation, that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 3 includes one server 230 coupled to one client device 210 via the network 220, it should be recognized that embodiments of the invention may be implemented using one or more such client devices coupled to one or more such servers.

In an embodiment, each of the client device 210 and server 230 may include all or fewer than all of the features associated with the computer 110 illustrated in and discussed with reference to FIG. 3. Client device 210 includes or is otherwise coupled to a computer screen or display 250. Client device 210 can be used for various purposes including both network- and local-computing processes.

The client device 210 is linked via the network 220 to server 230 so that computer programs, such as, for example, a browser, running on the client device 210 can cooperate in two-way communication with server 230. Server 230 may be coupled to database 240 to retrieve information therefrom and to store information thereto. Database 240 may include a plurality of different tables (not shown) that can be used by server 230 to enable performance of various aspects of embodiments of the invention. Additionally, the server 230 may be coupled to the computer system 260 in a manner allowing the server to delegate certain processing functions to the computer system.

An embodiment of the invention includes a first domain-identifier file 270 and a populating component 280, the functionality of which is discussed more fully hereinafter. At least portions of the component 280 may be executed by the server 230. Alternatively or additionally, at least portions of the component 280 may be executed by the computer system 260. Alternatively or additionally, at least portions of the component 280 may be executed by the client device 210. The first domain-identifier file 270 and/or component 280 may be implemented in any suitable hardware, software, firmware, or combination thereof.

Still referring to FIG. 3, and in operation according to an embodiment of the invention, a user (not shown) of the client device 210 desiring to apply one or more security policies to one or more web sites uses a browser application running on the client device to access web content, which may, but need not, be served by the server 230. Specifically, by employing an appropriate uniform resource locator (URL) in a known manner, the user may download from the server 230 and install on the client device 210 the first domain-identifier file 270 and/or component 280. Alternatively, the user may receive the first domain-identifier file 270 and/or component 280 on a tangible computer-readable medium (not shown), such as, for example, a CD-ROM, and subsequently install the file and/or component on the client device 210 from the medium.

Figure 4:
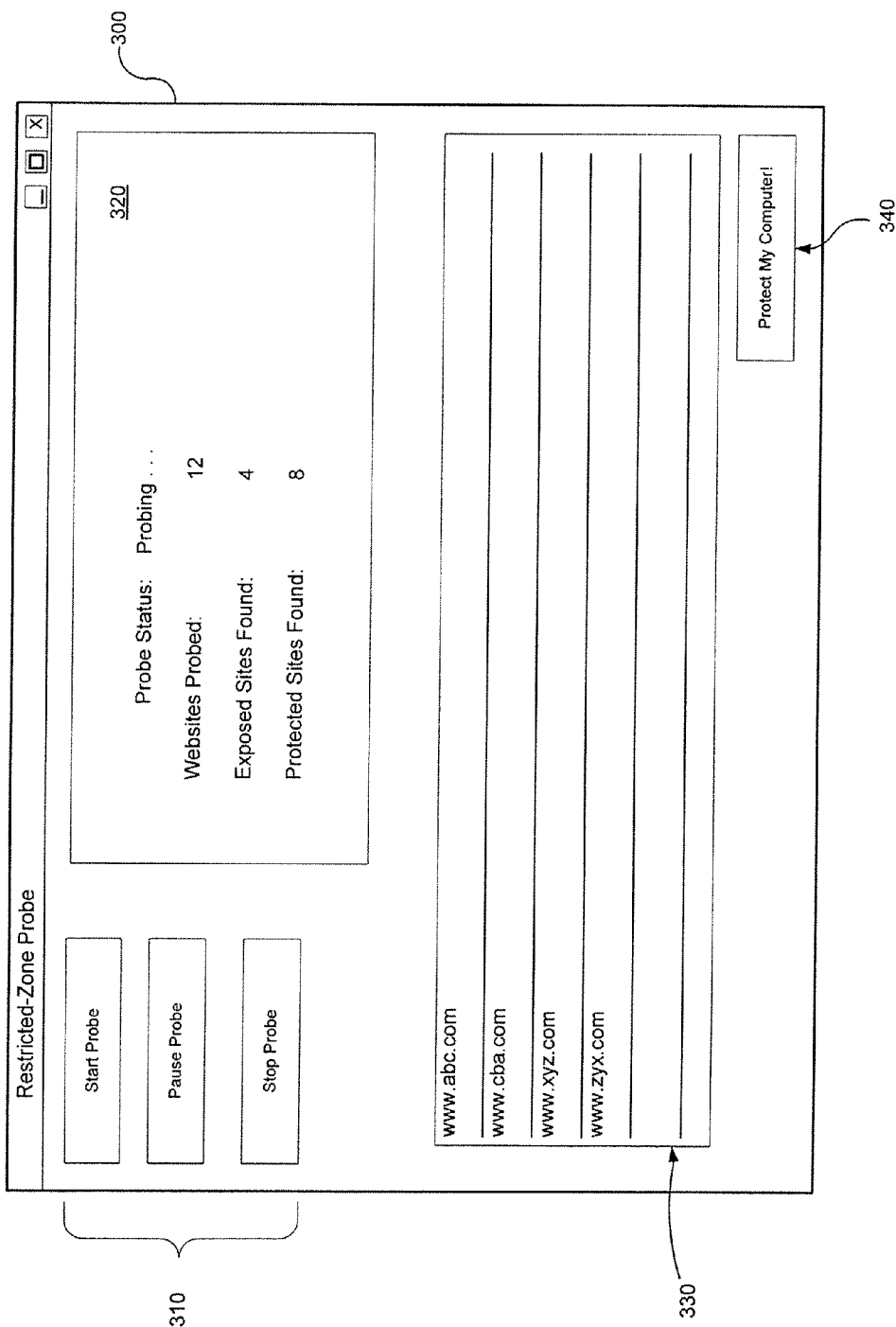
FIG. 4 illustrates a user interface according to an embodiment of the invention.

An embodiment of the invention, which may include the first domain-identifier file 270 and/or component 280, includes one or more user-interface components (not shown). As such, upon execution of an embodiment, a user interface including, for example, a window 300 (FIG. 4) may be presented to the user on a display device such as display 250. In the illustrated embodiment, the window 300 includes a control-button panel 310, the buttons of which are selectable via a conventional "point-and-click" device, such as a mouse (not shown), and enable the user to control probe functionality of the component 280 as described more fully hereinafter.

An embodiment of the file 270 includes domain identifiers associated with web sites that have been analyzed and categorized according to their trustworthiness and, as such, the extent to which each is appropriate for a particular security zone. For example, the file 270 may include a set of identifiers of sites appropriate for the "Restricted" zone (i.e., a zone having a more-restrictive policy than that of a zone having normal or average security requirements), a set of identifiers appropriate for a "Trusted" zone (i.e., a zone having a less-restrictive policy than that of a zone having normal or average security requirements), and/or sets of identifiers appropriate for respective ones of other zones of varying security requirements. The administrator of the server 230 or the administrator of a site hosted by the server 230 and from which the client device 210 ultimately receives the file 270 may make the determinations upon which such categorizations are based. These determinations may be made on an ongoing basis such that, periodically, a second domain-identifier file 290 (FIG. 3), and perhaps subsequent updated domain-identifier files (not shown) that include newly analyzed sites may be provided in a manner described above to the client device 210 to supplement or supplant the first domain-identifier file 270. In alternative embodiments, the second domain-identifier file 290 and subsequent updated domain-identifier files may be manually downloaded by the user or automatically uploaded to the client device 210. An embodiment allows users to submit web sites for review and automatic or manual inclusion in, for example, an updated domain-identifier file. Additionally, an embodiment enables a user to contact the server 230 for a real-time evaluation of a site rather than relying on a static domain-identifier file.

In an embodiment, the user interface allows the user to choose a security zone (i.e., Restricted, Trusted, etc.) for which a probe shall be performed using the window 300. Once the "Start Probe" button of the panel 310 is selected, the component 280 is operable to review the domain identifiers in the file 270, and to determine whether those domain identifiers currently populate the selected zone (in the example illustrated in FIG. 4, the Restricted zone) of the browser. In the illustrated embodiment, the status of this probe is displayed in a status pane 320 of the window 300. Those identifiers in the file 270 that do currently populate the zone are tallied into the total corresponding to the "Protected Sites Found" entry of the status pane 320. Those identifiers in the file 270 that do not currently populate the zone are tallied into the total corresponding to the "Exposed Sites Found" entry of the status pane 320. Sites corresponding to those identifiers in the file 270 that do not currently populate the zone may be displayed in a probe-results pane 330. After reviewing the sites listed in the results pane 330, the user may select a populate button 340 of the window 300 to populate the zone with all of the sites displayed in the results pane 330. In an embodiment, the user may, prior to selecting the populate button 340, select one or more of the sites listed in the results pane 330 to be excluded from populating the zone.

Figure 5:
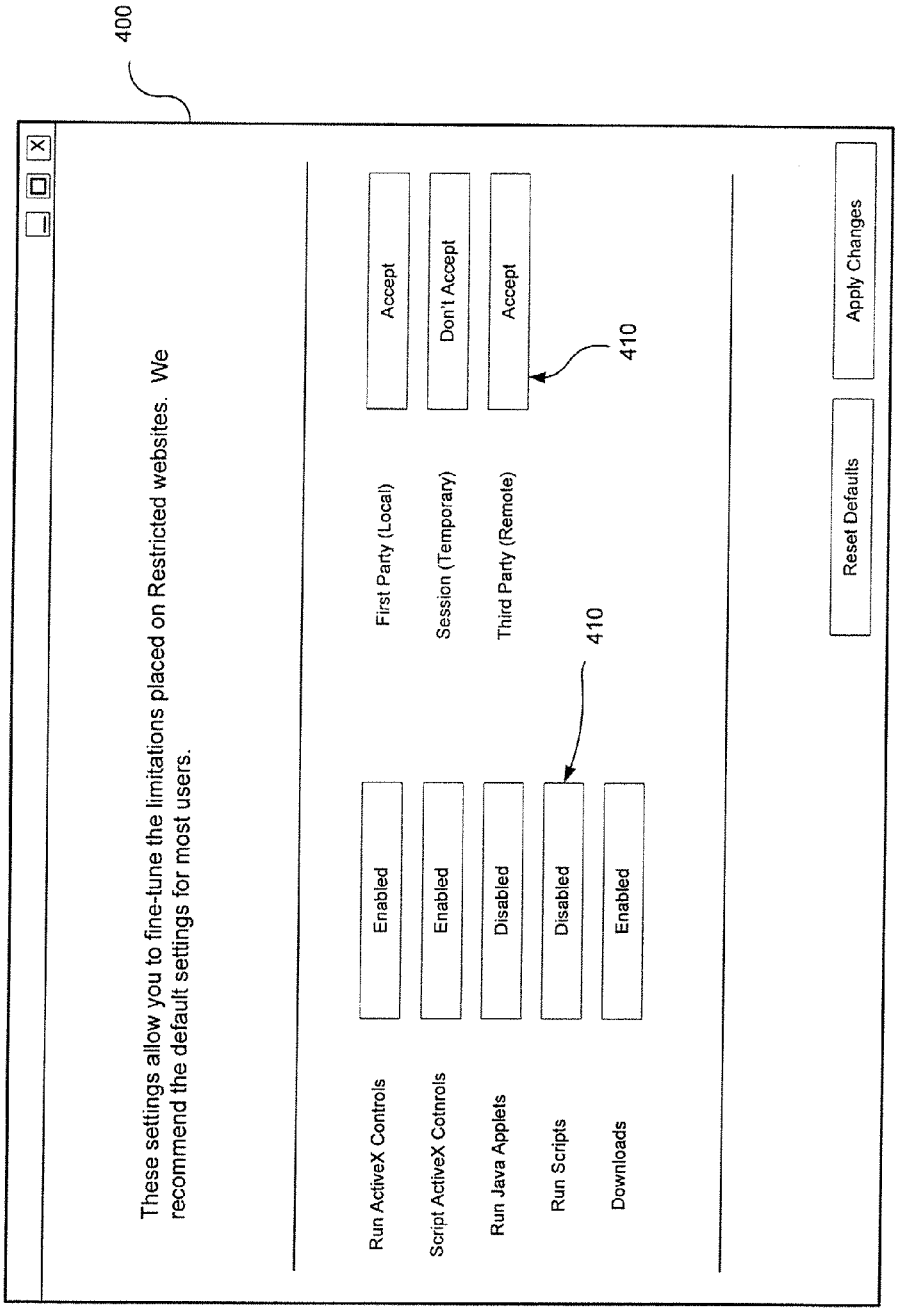
FIG. 5 illustrates a user interface according to an embodiment of the invention.

Referring to FIG. 5, the user interface of an embodiment may include a settings page 400 that enables a user to customize the security policy that will be applied to web sites that have been made subject to a particular zone. As illustrated in FIG. 5, the settings page may allow the user to enable/disable the ability of sites in the applicable zone to, for example, run ActiveX controls, script ActiveX controls, run Java Applets, etc. The user may enable/disable these settings by using setting buttons 410 to toggle between or otherwise select the permission settings.

Figure 6:
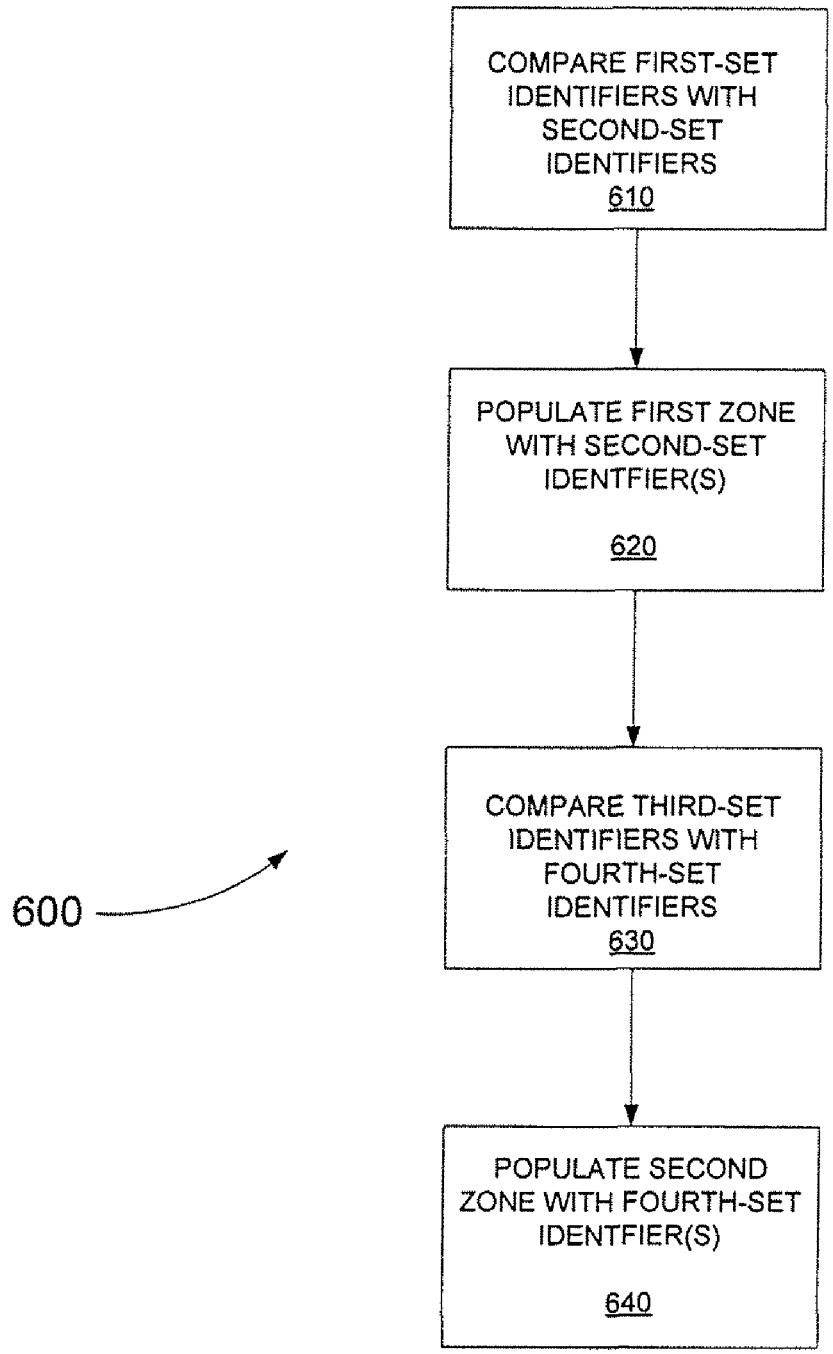
FIG. 6 is a flow diagram illustrating a method according to an embodiment of the invention.

FIG. 6 illustrates a process 600, according to an embodiment of the invention, that can be implemented in a system operable to execute a browser application having at least one security-context zone and operable to apply at least one security policy to interaction between the system and web sites corresponding to domain identifiers populating the security-context zone. The process 600 is illustrated as a set of operations shown as discrete blocks. The process 600 may be implemented in any suitable hardware, software, firmware, or combination thereof. As such the process 600 may be implemented in computer-executable instructions that can be transferred from one computer, such as server 230, to a second computer, such as client device 210, via a communications medium, such as network 220. The order in which the operations are described is not to be necessarily construed as a limitation.

At a block 610, a first set of domain identifiers populating a first security-context zone is compared with a second set of domain identifiers. For example, the populating component 280 may review a set of domain identifiers in the file 270 appropriate for the Restricted zone and determine whether those domain identifiers currently populate the Restricted zone of the browser.

At a block 620, the first security-context zone is populated with at least one second-set identifier not included in the first set of domain identifiers. For example, as discussed above, sites corresponding to those identifiers in the file 270 that do not currently populate the Restricted zone may be displayed in a probe-results pane 330. After reviewing the sites listed in the results pane 330, the user may select a populate button 340 of the window 300 to populate the Restricted zone with all of the sites displayed in the results pane 330. In an embodiment, the populating component 280 or other associated implementation may be operable to restrict the number of domain identifiers that can populate a given one or more of the zones and, as such, restrict the number of web sites to which a given one or more security policies are applied.

At a block 630, a third set of domain identifiers populating a second security-context zone is compared with a fourth set of domain identifiers. For example, the populating component 280 may review a set of domain identifiers in the file 270 appropriate for the Trusted zone and determine whether those domain identifiers currently populate the Trusted zone of the browser.

At a block 640, the second security-context zone is populated with at least one fourth-set identifier not included in the third set of domain identifiers. For example, sites corresponding to those identifiers in the file 270 that do not currently populate the Trusted zone may be displayed in a probe-results pane 330. After reviewing the sites listed in the results pane 330, the user may select a populate button 340 of the window 300 to populate the Trusted zone with all of the sites displayed in the results pane 330.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follow:

1. A computer implemented method for customizing security policy settings in a browser application that will be applied to domain identifiers corresponding to websites, the method comprising:
    displaying, by a computing device, a user interface to customize the security policy settings in the browser application, wherein the user interface enables a user to send a first request to update a first set of domain identifiers that correspond to a first set of websites that populate a first security-context zone of the browser application, wherein the first security-context zone is associated with a first security policy;
    in response to receiving the first request, comparing the first set of domain identifiers that populate the first security-context zone with a second set of domain identifiers that correspond to a second set of websites;
    presenting, on the user interface, a list of domain name identifiers found within the second set of domain identifiers that are not currently found within the first set of domain identifiers that populate the first security-context zone;
    populating the first security-context zone with at least one identifier found within the second set of identifiers that is not included in the first set of domain identifiers;
    displaying the user interface, wherein the user interface enables a user to send a second request to update a third set of domain identifiers that correspond to websites that populate a second security-context zone of the browser application, wherein the second security-context zone is associated with a second security policy;
    in response to receiving a second request, comparing the third set of domain identifiers that populate the second security-context zone with a fourth set of domain identifiers corresponding to a third set of websites;
    presenting, on the user interface, a list of domain name identifiers found within the fourth set of domain identifiers that are not currently found within the third set of domain identifiers that populate the second security-context zone; and
    populating the second security-context zone with at least one identifier found within the fourth set of domain identifiers that is not included in the third set of domain identifiers,
    wherein the first security policy is more restrictive than the second security policy.

2. The method of claim 1, further comprising transferring the second set of domain identifiers from first computer to second computer through a communications medium.

3. The method of claim 1, further comprising restricting the number of domain identifiers that can populate the first security-context zone.

4. The method of claim 1, further comprising enabling a user to customize the security policy associated with the first security-context zone.

5. A computer system for customizing security policy settings in a browser application that will be applied to domain identifiers corresponding to websites, the system comprising:
    a computer processor; and
    a memory storing computer-executable instructions that when executed by the computer processor, cause the computer processor to perform steps of:
    displaying a user interface to customize the security policy settings in the browser application, wherein the user interface enables a user to send a first request to update a first set of domain identifiers that correspond to a first set websites that populate a first security-context zone of the browser application, wherein the first security-context zone is associated with a first security policy;
    in response to receiving the first request, comparing the first set of domain identifiers that populate the first security-context zone with a second set of domain identifiers that correspond to a second set of websites;
    presenting, on the user interface, a list of domain name identifiers found within the second set of domain identifiers that are not currently found within the first set of domain identifiers that populate the first security-context zone;
    populating the first security-context zone with at least one identifier found within the second set of identifiers that is not included in the first set of domain identifiers;

displaying the user interface, wherein the user interface enables a user to send a second request to update a third set of domain identifiers that correspond to websites that populate a second security-context zone of the browser application, wherein the second security-context zone is associated with a second security policy;

in response to receiving a second request, comparing the third set of domain identifiers that populate the second security-context zone with a fourth set of domain identifiers corresponding to a third set of websites;

presenting, on the user interface, a list of domain name identifiers found within the fourth set of domain identifiers that are not currently found within the third set of domain identifiers that populate the second security-context zone; and populating the second security-context zone with at least one identifier found within the fourth set of domain identifiers that is not included in the third set of domain identifiers, wherein the first security policy is more restrictive than the second security policy.

6. A non-transitory computer-readable storage medium storing computer-executable instructions for customizing security policy settings in a browser application that will be applied to domain identifiers corresponding to websites that, when executed in a computing system, perform steps of:

displaying a user interface to customize the security policy settings in the browser application, wherein the user interface enables a user to send a first request to update a first set of domain identifiers that correspond to a first set websites that populate a first security-context zone of the browser application, wherein the first security-context zone is associated with a first security policy;

in response to receiving the first request, comparing the first set of domain identifiers that populate the first security-context zone with a second set of domain identifiers that correspond to a second set of websites;

presenting, on the user interface, a list of domain name identifiers found within the second set of domain identifiers that are not currently found within the first set of domain identifiers that populate the first security-context zone;

populating the first security-context zone with at least one identifier found within the second set of identifiers that is not included in the first set of domain identifiers;

displaying the user interface, wherein the user interface enables a user to send a second request to update a third set of domain identifiers that correspond to websites that populate a second security-context zone of the browser application, wherein the second security-context zone is associated with a second security policy;

in response to receiving a second request, comparing the third set of domain identifiers that populate the second security-context zone with a fourth set of domain identifiers corresponding to a third set of websites;

presenting, on the user interface, a list of domain name identifiers found within the fourth set of domain identifiers that are not currently found within the third set of domain identifiers that populate the second security-context zone; and populating the second security-context zone with at least one identifier found within the fourth set of domain identifiers that is not included in the third set of domain identifiers, wherein the first security policy is more restrictive than the second security policy.

7. The medium of claim 6, wherein the method further comprises restricting the number of domain-identifiers that can populate the first security-context zone.

8. The medium of claim 6, wherein the method further comprises enabling a user to customize the security policy associated with the first security-context zone.

* * * * *